(12) United States Patent
Paniagua, Jr. et al.

(10) Patent No.: US 8,370,650 B2
(45) Date of Patent: *Feb. 5, 2013

(54) POWER SUPPLY CAPABLE OF RECEIVING DIGITAL COMMUNICATIONS FROM ELECTRONIC DEVICES

(75) Inventors: Frank Patrick Paniagua, Jr., San Ramon, CA (US); Patrick Edward Weston, Cameron Park, CA (US)

(73) Assignee: Greenplug, Inc., Pleasanton, CA (US)

( * ) Notice: Subject to any disclaimer, the term of this patent is extended or adjusted under 35 U.S.C. 154(b) by 69 days.

This patent is subject to a terminal disclaimer.

(21) Appl. No.: 12/487,487

(22) Filed: Jun. 18, 2009

(65) Prior Publication Data

US 2009/0259867 A1    Oct. 15, 2009

Related U.S. Application Data

(63) Continuation of application No. 11/513,687, filed on Aug. 30, 2006, now abandoned.

(51) Int. Cl.
G06F 1/26     (2006.01)
(52) U.S. Cl. .............. 713/300; 320/114; 455/573
(58) Field of Classification Search .......... 713/323, 713/300; 320/114; 455/573; 710/16
See application file for complete search history.

(56) References Cited

U.S. PATENT DOCUMENTS

| | | |
|---|---|---|
| 5,045,712 A | 9/1991 | Baggenstoss |
| 5,245,220 A | 9/1993 | Lee |
| 5,347,211 A | 9/1994 | Jakubowski |
| 5,621,299 A | 4/1997 | Krall |
| 5,715,156 A | 2/1998 | Yilmaz et al. |
| 5,884,086 A | 3/1999 | Amoni et al. |
| 5,886,422 A | 3/1999 | Mills |
| 6,064,177 A | 5/2000 | Dixon |
| 6,194,883 B1 | 2/2001 | Shimamori |
| 6,396,169 B1 | 5/2002 | Voegeli et al. |
| 6,459,604 B1 | 10/2002 | Youn et al. |
| 6,541,879 B1 | 4/2003 | Wright |
| 6,643,158 B2 | 11/2003 | McDonald et al. |
| 6,650,560 B2 | 11/2003 | MacDonald et al. |
| 6,700,808 B2 | 3/2004 | MacDonald et al. |
| 6,751,109 B2 | 6/2004 | Doss et al. |
| 6,775,163 B2 | 8/2004 | McDonald et al. |
| 6,791,853 B2 | 9/2004 | Afzal et al. |
| 6,903,950 B2 | 6/2005 | Afzal et al. |
| 6,920,056 B2 | 7/2005 | MacDonald et al. |
| 6,937,490 B2 | 8/2005 | MacDonald et al. |
| 6,976,885 B2 | 12/2005 | Lord |
| 7,081,743 B2 | 7/2006 | Liu et al. |
| 7,139,181 B2 | 11/2006 | Afzal et al. |
| 7,153,169 B2 | 12/2006 | Lord |
| 7,271,568 B2 * | 9/2007 | Purdy et al. .......... 320/106 |
| 7,394,676 B2 * | 7/2008 | Patel ................... 363/142 |
| 7,459,886 B1 * | 12/2008 | Potanin et al. ........ 320/135 |

(Continued)

OTHER PUBLICATIONS

Intel Corporation, "Power Delivery Design Issues for Hi-Speed USB on Motherboards," 2002, 17 pages.

(Continued)

*Primary Examiner* — Albert Wang
(74) *Attorney, Agent, or Firm* — Morgan, Lewis & Bockius LLP

(57) ABSTRACT

A power supply capable of receiving digital communications from an electrical device is described. The power supply includes a microprocessor and instructions, configured for execution by the microprocessor, to receive a digital communication from a device to be powered by the power supply. A method of supplying power is also described. The method includes receiving a digital communication from a device and supplying power to the device based on the digital communication.

8 Claims, 7 Drawing Sheets

U.S. PATENT DOCUMENTS

| | | |
|---|---|---|
| 2003/0218550 A1 | 11/2003 | Herrmann |
| 2005/0102043 A1 | 5/2005 | Menas et al. |
| 2007/0030715 A1 | 2/2007 | Manolescu |
| 2007/0030716 A1 | 2/2007 | Manolescu |
| 2007/0230227 A1 | 10/2007 | Palmer |

OTHER PUBLICATIONS

Mobility Electronics, Inc., "Power Patent Portfolio," Nov. 21, 2006, 27 pages.

"On The-Go Supplement to the USB 2.0 Specification," revision 1.3, Dec. 5, 2006, 53 pages (revised from revision 1.2, Apr. 4, 2006).

Philips Semiconductors, "The I$^2$C-Bus Specification," Version 2.1, Jan. 2000, 46 pages.

"PMBus™ Power System Management Protocol Specification Part I—General Requirements, Transport and Electrical Interface," Revision 1.0, Mar. 28, 2005, www.powerSIG.org, System Management Interface Forum, Inc., 17 pages.

"PMBus™ Power System Management Protocol Specification Part II—Command Language," Revision 1.0, Mar. 28, 2005, www.powerSIG.org, System Management Interface Forum, Inc., 81 pages.

Sam Davis, "PMBus Defines Standard for Digital Control of Power Management Subsystems," Electronic Design, Jul. 20, 2005, 6 pages.

"System Management Bus (SMBus) Specification," Version 2.0, Aug. 3, 2000, SBS Implementers Forum, 59 pages.

USBIF, "Universal Serial Bus," PlusPower Electro-Mechanical Specification Version 0.8f, 1999, 26 pages.

"Universal Serial Bus Specification," Revision 2.0, Apr. 27, 2000, Table of Contents ii-xiv, Chapter 4 pp. 15-24, Chapter 7 pp. 119-194, and Chapter 8 pp. 195-238.

International Search Report and Written Opinion for International Application No. PCT/US2007/77033, mailed May 22, 2008.

"Smart Battery Data Specification," Rev. 1.0, Release a, Duracell Inc. and Intel Corp., Feb. 15, 1995, 35 pages.

Office Action for U.S. Appl. No. 11/513,687 dated May 20, 2009.

Office Action for U.S. Appl. No. 11/513,687 dated Dec. 22, 2008.

\* cited by examiner

POWER SUPPLY CAPABLE OF RECEIVING DIGITAL COMMUNICATIONS FROM ELECTRONIC DEVICES

CROSS REFERENCE TO RELATED APPLICATIONS

This application is a continuation of U.S. application Ser. No. 11/513,687, filed Aug. 30, 2006 now abandoned, titled "Power Supply Capable of Receiving Digital Communications from Electronic Devices", which is hereby incorporated by reference in their entireties.

TECHNICAL FIELD

The disclosed embodiments relate generally to power supplies, and more particularly, to a power supply that is capable of receiving digital communications from devices to be powered by the power supply.

BACKGROUND

Consumer electronic devices are ubiquitous in the world we live in today. From laptop computers and personal digital assistants to multimedia players and mobile phones, people today own a wide variety of electronic devices. These electronic devices come with a wide variety of power supplies, sometimes referred to as "wall warts," "power bricks," or "power adapters." Unfortunately, these power supplies are often specific to the device type, device manufacturer, and/or device product line, and are therefore incompatible with each other. If user loses a power supply for a device, the power supply of another device generally cannot be used as a substitute. This causes many problems. Travel is made more inconvenient by the prospect of having to bring multiple power supplies for various portable devices. A device may be damaged and/or its useful life shortened if the wrong power supply is used. Furthermore, as devices become obsolete and are discarded by users, the power supplies for the devices may be discarded as well because users often do not have other devices that are compatible with these power supplies.

Attempts have been made to resolve the problem associated with incompatible power supplies. One attempt involves a common power supply with a swappable interface between the power supply and the device to be powered. An example of this attempt is iGo (a trademark of Mobility Electronics, Inc.), which employs swappable connector tips. However, this attempt does not adequately solve the problems of incompatibility (the tips are still device/manufacturer/product-line specific), damage to a device caused by the use of the wrong tip, and waste caused by obsolescence.

Accordingly, what is needed is a power supply that can be used to power a wide variety of devices without resorting to device-specific interfaces.

SUMMARY

The above deficiencies and other problems associated with power supplies are reduced or eliminated by the disclosed power supply and an electronic device that are capable of digital communications with each other.

According to some embodiments, a power supply includes one or more microprocessors, and one or more sets of instructions configured for execution by the one or more microprocessors. The one or more sets of instructions include instructions to receive a digital communication from a device to be powered by the power supply.

According to some embodiments, a power supply includes one or more circuits for receiving a digital communication from a device to be powered by said power supply.

According to some embodiments, a power supply includes means for receiving a digital communication from a device, and means for supplying power to said device based on said digital communication.

According to some embodiments, a method of supplying power includes receiving a digital communication from a device, and supplying power to the device based on said digital communication.

According to some embodiments, an electrical device includes one or more microprocessors, and one or more sets of instructions configured for execution by the one or more microprocessors. The one or more sets of instructions include instructions to transmit a digital communication to a power supply external to the electrical device.

According to some embodiments, an electrical device includes one or more circuits for transmitting a digital communication to an external power supply.

According to some embodiments, an electrical device includes means for transmitting a digital communication to an external power supply, and means for receiving power supplied by the external power supply based on the digital communication.

According to some embodiments, a method of receiving power includes transmitting a digital communication to an external power supply, and receiving power supplied by the external power supply based on the digital communication.

According to some embodiments, a power supply includes one or more circuits, means for receiving a digital communication, and means for configuring, based on said digital communication, the one or more circuits to supply a constant voltage or power conforming to one or more battery type-dependent charging requirements.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Figure 1:
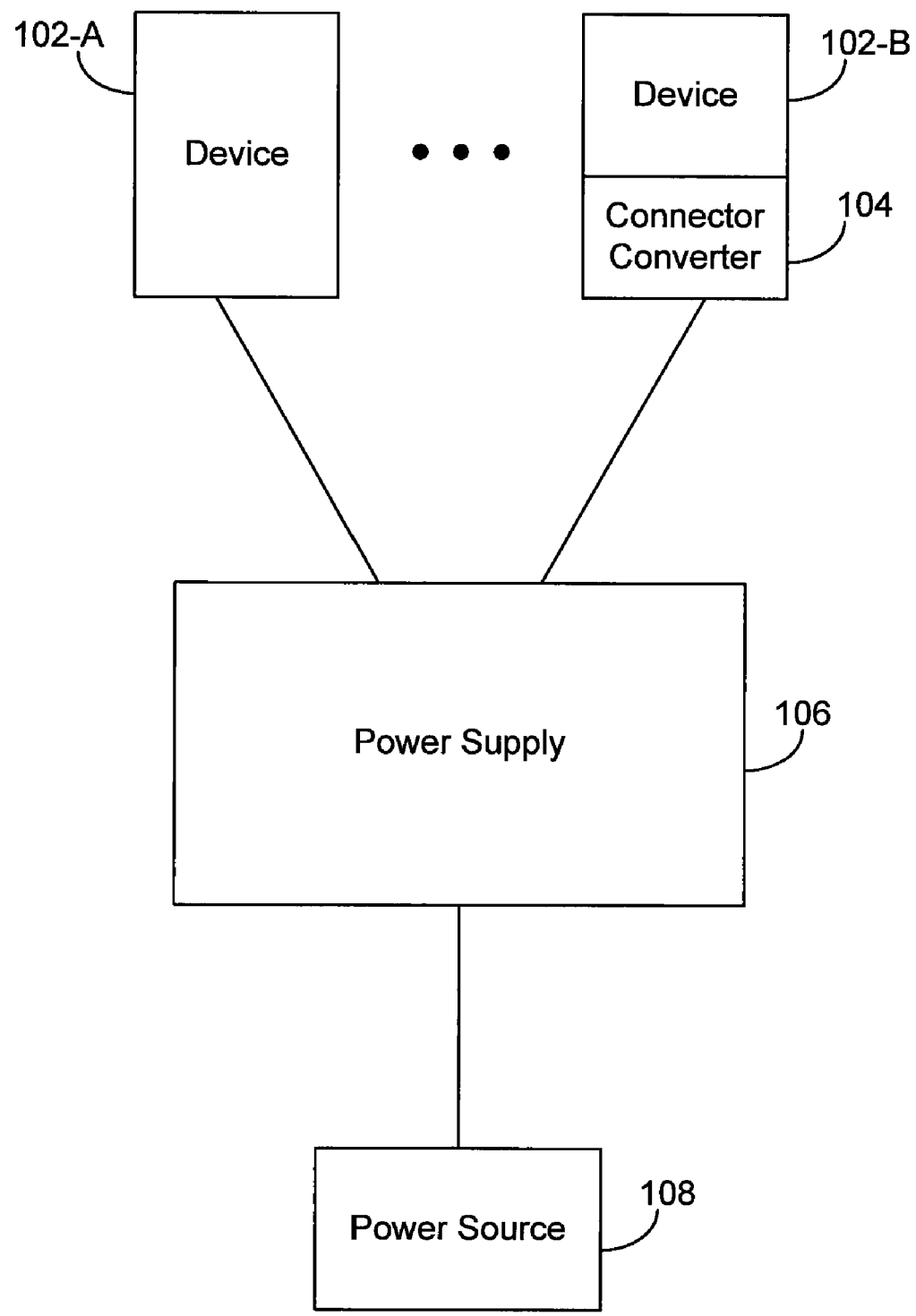
FIG. 1 is a block diagram illustrating a power supply coupled to a power source and electronic devices in accordance with some embodiments.

Attention is now directed to FIG. 1, which illustrates a power supply coupled to a power source and devices in accordance with some embodiments. A power supply 106 may be electrically coupled to a power source 108, from which the power supply 106 receives electrical power to be supplied to devices 102. The power source may be a source of alternating current (AC) or direct current (DC) voltage. In some embodiments, the power source is a power outlet, such as a wall outlet. The power outlet may provide AC voltage, which is typically 110 V in the United States and may be at other voltages outside the United States and/or depending upon local requirements. In some other embodiments, the power source is an outlet in an airplane armrest or in an automobile, such as a cigarette lighter socket, which provides 12 V DC voltage. In further other embodiments, the power source is a motor, generator, battery, etc. that provides electricity. Depending on the particular embodiment, the power supply 106 may be configured for coupling to only a DC power source, only an AC power source, or either a DC or AC power source. The power supply 106 may be coupled to the power source 108 via a power cord, cable, or the like.

The power supply 106 may be electrically coupled to one or more devices 102. The devices 102 may include any of a variety of electronic devices, including but not limited to consumer electronic devices, computer devices and peripherals (e.g., desktop computers, laptop computers, printers, scanners, monitors, laptop docking stations, etc.), small appliances, battery chargers, and power tools. Depending on the particular embodiment, if there are multiple devices 102 coupled to the power supply 106, the devices 102 may be coupled to the power supply 106 independently or in series or in parallel.

In some embodiments, the power supply 106 is a standalone unit, external to and distinct from devices to be powered by the power supply 106. The external power supply 106 may be electrically coupled to one or more devices via power cords, cables, or the like (not shown). In some embodiments, both the power supply 106 and a device 102-A conform to a common connector or interface standard; the power cord coupling the power supply 106 to a given device, such as the device 102-A includes standardized connectors on one or both ends of the cord, and may, in some embodiments, be non-detachably affixed to the power supply 106. A device may be designed to use the standardized connector and be coupled to the power supply via a cord having the standardized connectors. In other words, the power supply serves as a universal power supply to any device that is designed to include the standardized connector.

In some other embodiments, the power supply 106 and a device 102-B use different types of power connectors. For example, a device that is not designed to use the standardized connector (e.g., an older device) may have a power connector that is device or manufacturer specific and not conforming to the standard that is used by the power supply 106. In such embodiments, the power supply 106 may be coupled directly to the device 102-B via a cord that includes the standardized connector on one end and a device or manufacturer specific connector on the other end. In other words, the cord is customized to the connector on the device because at least one connector on the cord is device or manufacturer specific. Alternatively, an attachment, such as a dongle, may be coupled to the device 102-B. The attachment "converts" the connector on the device 102-B to the standardized connector utilized by the power supply 106, thereby allowing coupling of the power supply 106 and the device 102-B via a cord having the standardized connector on both ends. An example of such a connector converter 104 is shown in FIG. 1.

In some other embodiments, the power supply 106 is integrated with the device to be powered by the power supply. For example, the power supply 106 may be the internal power supply of a desktop computer, an audio/visual receiver or preamplifier, a power strip or surge protector, an uninterruptible power supply, or something similar. Furthermore, in some embodiments, other external devices may be electrically coupled to a power supply 106 that is integrated into another device. For example, returning to the example of the power supply 106 integrated with a desktop computer, other external devices, such as a monitor, printer, and scanner, may be coupled to the power supply that is integrated with the desktop computer. The integrated power supply supplies power to the coupled external devices as well as the desktop computer.

The power supply 106 may come in a variety of sizes. For example, the power supply 106 may be implemented in a relatively small size for ease of portability and travel convenience. Relatively larger power supplies 106 may be implemented for home, office, or industrial use.

As described above, devices 102 that may be electrically coupled to the power supply 106 may encompass a variety of electronic devices, including but not limited to consumer electronic devices (e.g., mobile phones, cordless phones, baby monitors, televisions, digital cameras, camcorders, MP3 or video players, CD or DVD players, VCRs, personal digital assistants (PDAs)), computer devices (e.g., computers, network routers, non-volatile storage, printers, monitors, scanners), small appliances, battery chargers, and power tools. Some of these devices may include a battery or batteries and some may not. The battery (or batteries) may be rechargeable or non-rechargeable. Examples of rechargeable battery technologies include lithium-ion batteries, nickel cadmium batteries, and nickel metal hydride batteries. Examples of non-rechargeable battery technologies include alkaline and lithium batteries. For a device that does not have a battery or that has non-rechargeable batteries, the power supplied by the power supply 106 merely powers the device for operation. For a device that has a rechargeable battery, the power supplied by the power supply 106 powers the device for operation and/or recharges the battery. As it is known in the art, different devices and batteries have different power requirements for operation and/or battery charging. Thus, the power supply 106 needs to know the power requirements of the devices 102, in order to supply the proper amount of power.

Figure 2:
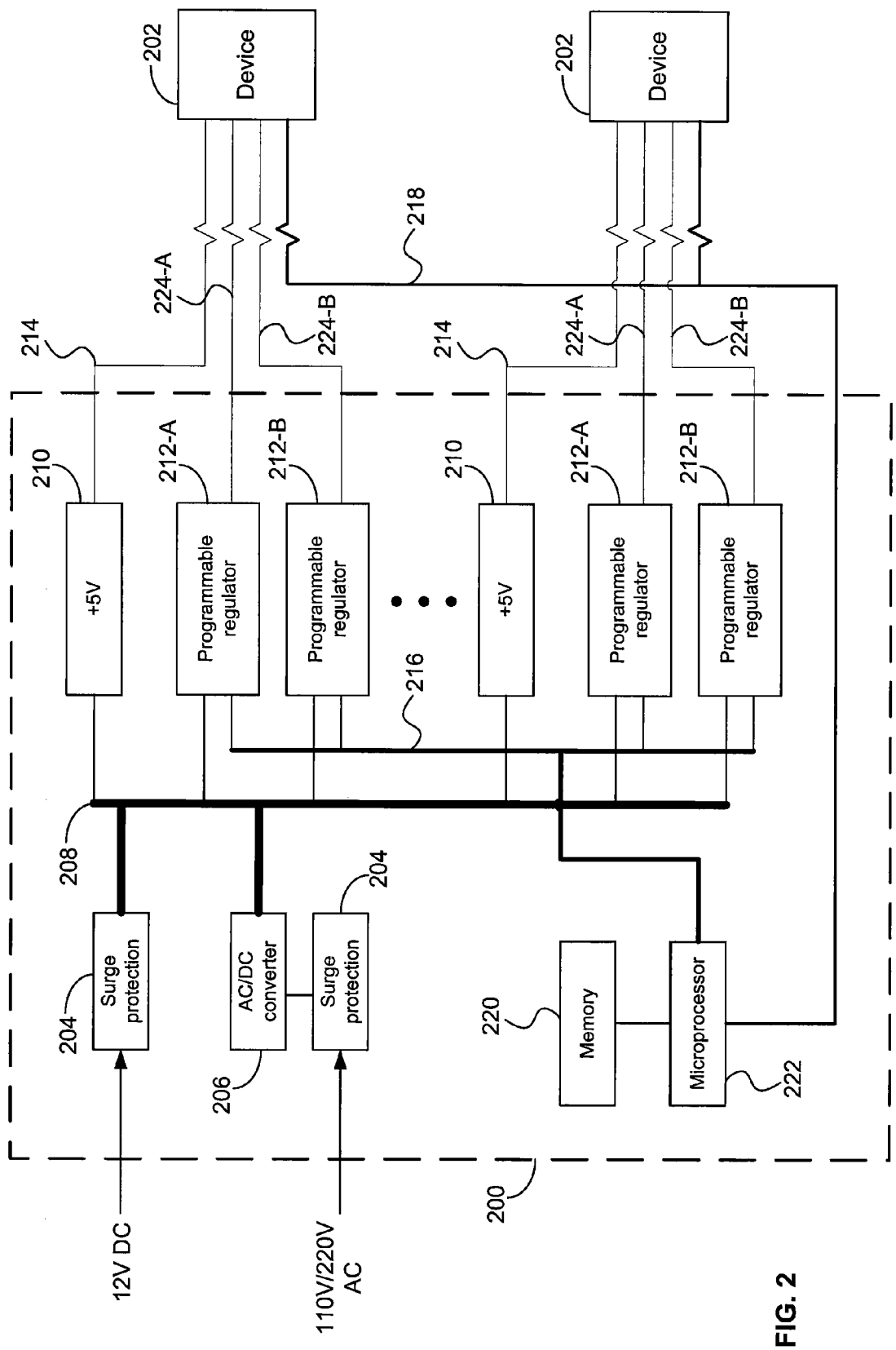
FIG. 2 is a block diagram illustrating a power supply capable of receiving digital communications from devices in accordance with some embodiments.
Figure 3:
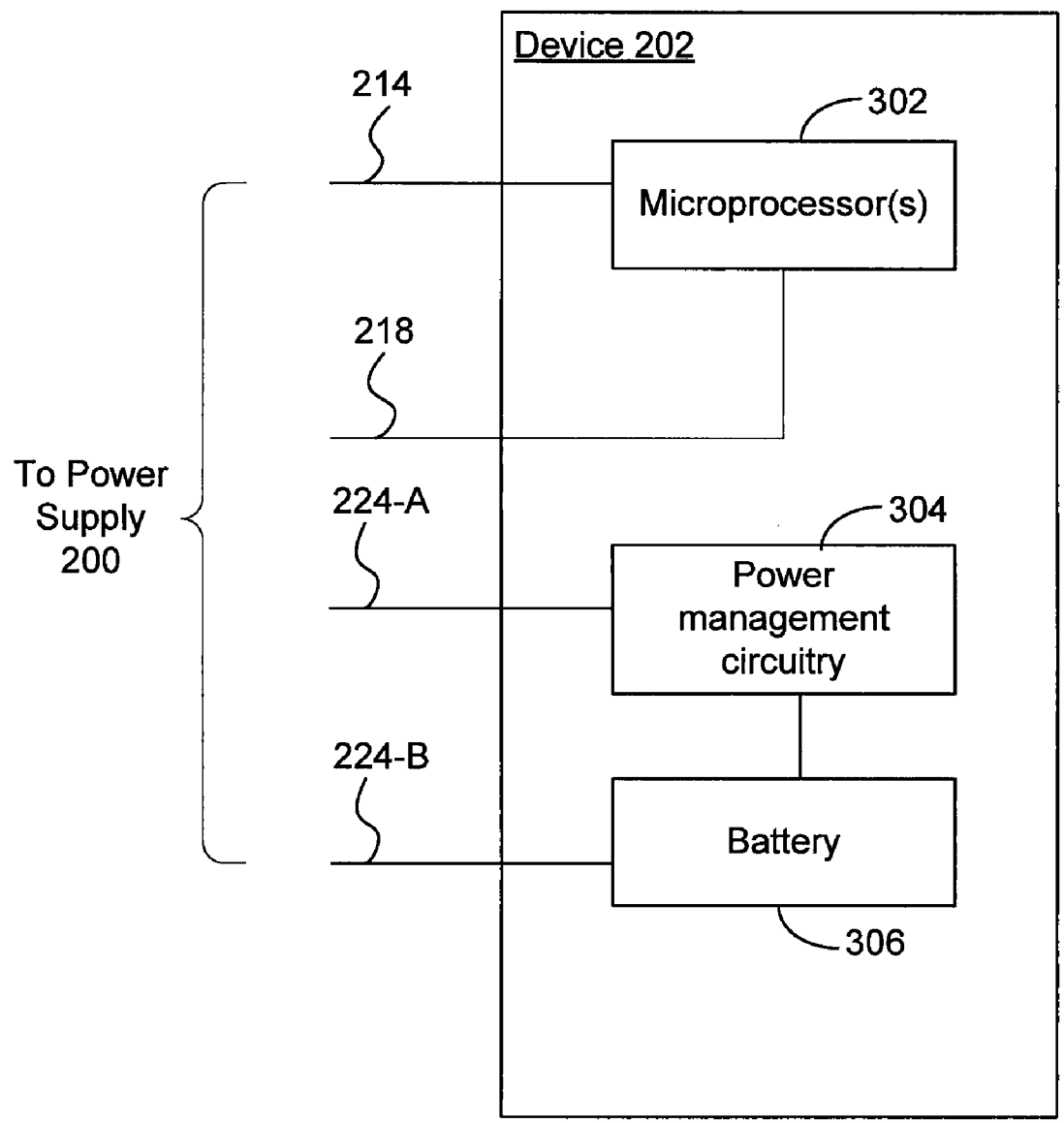
FIG. 3 is a block diagram illustrating a device capable of sending digital communications to a power supply in accordance with some embodiments.

Attention is now directed to FIGS. 2-3, which are block diagrams illustrating a power supply 200 capable of receiving digital communications from electronic devices and a device 202 capable of sending digital communications to a power supply in accordance with some embodiments. The power supply 200 acquires information regarding power requirements of a device 202 to be powered by the power supply 200 via digital communications between the power supply 200 and the device 202. Based on the information, the power supply may supply power to the devices 202 in accordance with the power requirements of the devices 202.

A power supply 200 may receive either a DC input voltage (e.g., 12 V from an automobile cigar lighter socket) or an AC input voltage (e.g., 110 V or a 220 V from a wall outlet) from a power source 108. Either input voltage may be fed through surge protection circuitry/components 204 in the power supply 200. The (optional) surge protection circuitry or components, which are well known in the art, may be included in the power supply 200 for protection against power surges or electrical spikes. Voltage from an AC source may also be fed through an AC/DC converter 206. The AC/DC converter 206 converts voltage from the AC source to a DC voltage for use by devices 202.

The electrical power may be fed from the surge protection circuitry 204 or the AC/DC converter 206, through an electrical bus 208, to various circuitries within the power supply 200. The circuitries within the power supply 200 may include a circuitry 210 for supplying a predefined voltage and one or more programmable regulators 212. In some embodiments, the predefined voltage circuitry 210 supplies a predefined "wake-up" voltage to the devices 202. In some embodiments, the predefined voltage is +5 V. The "wake-up" voltage may facilitate the powering-on of a device 202 and/or digital communications between the device 202 and the power supply 200. The "wake-up" voltage may be provided to the device 202 via a predefined voltage line 214 that is electrically coupled to a microprocessor 302 within the device. The "wake-up" voltage powers the device microprocessor 302, facilitating the microprocessor 302 to execute instructions to send digital communications containing power requirements to the power supply 200 on the communications line 218.

One or more programmable regulators 212 supply power to a device 202, via one or more supply conductor lines 224. The power supplied by a programmable regulator 212 may be in the form of a constant voltage and/or a constant current. In some embodiments, there may be two or more regulators 212: at least one regulator 212-A that is coupled to a power management circuitry 304 of the device 202 via a supply conductor line 224-A and is responsible for supplying a constant voltage for powering the device 202, and at least one regulator 212-B that is electrically coupled to a battery 306 of to the device 202 via a supply conductor lines 224-B and is responsible for supplying a constant current for charging the battery 302. In some other embodiments, there may be one regulator 212 that is responsible for supplying a constant voltage or a constant current. In some embodiments, the programmable regulator 212 is a programmable switching regulator. In some other embodiments, the programmable regulator 212 is a programmable linear regulator.

Programmable power supplies are well known in the art. Generally, these are digitally controlled power sources that can provide adjustable output values, e.g., voltage or current, through the use of feedback circuitry and a digital reference value. For example, after a digital reference value is specified, if the output voltage is too low a controlling element is instructed to produce a higher voltage. Conversely, if the output voltage is higher than the specified digital reference value, the controlling element is instructed to produce a lower voltage. Furthermore, those skilled in the art will recognize the use and application of linear or switching regulators in programmable power supplies.

The regulator(s) 212 supply power to devices 202 in accordance with one or more provided parameters. In some embodiments, the one or more parameters provided to the regulator(s) 212 may include an amount of voltage, current, and/or wattage to be supplied to the device. In other embodiments, the parameters may also include an identifier related to the device. In some embodiments, this identifier provides a mechanism to validate or track licenses. In other embodiments, this identifier enables an original equipment manufacturer ("OEM") to implement one or more proprietary functions related to a device and may also enable the transmission of proprietary information between the device and the power supply. For example, where the identifier of a rechargeable battery indicates that it is from the same manufacturer as the power supply, additional proprietary information, such as the total number of charge cycles of the battery, may be passed to the power supply. By way of further example, where the identifier indicates the same OEM, enhanced or alternate functions may be available, which may affect the behavior of the power supply in order to remain in compliance with the specifications of the manufacturer. In other words, the provided parameters configure or "program" the programmable regulator(s) 212 to supply power that conform to the power requirements of a device 202 to the device 202. The parameters may be provided to the programmable regulator(s) 212 via a data bus 216 by a microprocessor 222.

The power supply 200 includes one or more microprocessors 222. The microprocessor 222 sends and receives digital communications from devices 202 and configures the programmable regulators 212 by providing parameters such as voltage and current values. The microprocessor 222 sends and receives digital communication from devices 202 via a communications bus 218. The microprocessor 222 receives and processes digital messages from the devices 202. In some embodiments, the processing of a digital message from a device 202 includes error detection, inspecting the contents of the message, and based on the contents, execute further instructions. Based on the content of the messages, the microprocessor 222 executes instructions to send responses to the devices 202 via the communications bus 218 and/or provide voltage or current values to the programmable regulators 212.

In some embodiments, the microprocessor 222 is coupled to a memory 220. Memory 220 may include non-volatile memory such as a hard disk drive or flash memory. In some embodiments, microprocessor 222 is integrated on the same die as memory 220. Memory 220 may store data that the microprocessor 222 may reference in the process of communicating with the devices 202 and configuring the programmable regulators 212.

In some embodiments, memory 220 stores a database of predefined power profiles. A power profile is a predefined set of data that specifies power requirements, or more particularly, a predefined combination of power requirement parameters. In some embodiments, a power profile includes one or more of the following: a constant voltage value, a constant current value, a wattage value, an upper limit current value, and a battery type. The power profiles may be organized as a lookup table in memory 220, with each power profile referenced by an identifier. A device 202 may communicate, in a digital message, the identifier of the desired profile to the microprocessor 222. The microprocessor 222 retrieves from memory 220 the power profile corresponding to the identifier provided by the device 202. Parameters in the retrieved power profile are used to configure the programmable regulators 212.

In some other embodiments, memory 220 stores a database of battery information. The database of battery information is similar to the database of power profiles described above; the database of battery information includes predefined sets of power requirement parameters for batteries. As with the power profile database, the battery information database may be organized as a lookup table. The database may include sets of data that are specific to particular models of batteries. The sets of data in the battery information database may be associated with and identified by an identifier such as a combination of a vendor/manufacturer identifier and model number. The power requirement data sets for batteries may include one or more of the following: a constant voltage value, a constant current value, a wattage value, an upper limit current value, a maximum charge duration, and a maximum operational temperature during a charge cycle (which may be sensed using a thermistor attached to the battery). Similar to the power profiles described above, a device may communicate, in a digital message, an identifier of a battery coupled to the device to the microprocessor 222. The microprocessor 222 retrieves from memory 220 the power requirement data set corresponding to the battery identifier provided by the device. Values in the retrieved power requirement data set are used to configure the programmable regulators 212. It should be appreciated, however, that memory 220 may include either or both of the power profile and battery information databases.

In further other embodiments, memory 220 may include a database of identifiers associated with known vendors of devices or a database of identifiers of devices. Furthermore, in alternative embodiments, the power supply 200 may omit memory 220 entirely. The power supply 200 may accept messages from devices that specify the actual power requirements but not messages identifying a power profile or battery model. In such embodiments, the device 202 must signal the power requirements directly and not rely on the power supply 200 to determine the power requirements based on merely a power profile identifier or a battery model identifier. In other embodiments, battery database information or identifier database information stored in memory 220 may be automatically updated when an "unknown" device is identified by the power supply. Additionally, in other embodiments, manual updating of database information in memory 220 may occur.

In some embodiments, the power supply 200 and a device 202 may be coupled via additional lines. For example the power supply 200 and the device 202 may also be coupled by a battery thermistor line. The thermistor aids in the monitoring of the temperature of a battery coupled to the device 202 as a safeguard against overheating of the battery. As another example, the power supply 200 and the device 202 may be coupled by a 0V ground or signal return line. In some embodiments, the lines 214, 218, 224, etc. coupling the power supply 200 to a device 202 may be implemented as conductive elements running within the power supply 200 or the device 202 that terminate at a connector or interface that includes a plurality of conductive pins terminals. The connector at the power supply 200 and the connector at the device 202 may be coupled by a cord or the like that has connectors on the ends that match the connectors on the power supply 200 and the device 202 and has distinct conductive elements (e.g., wires) within the cord corresponding to each of the lines.

In some embodiments, a power supply 200 may be further configured to receive messages containing proprietary information from a device 202. A device may be configured by its manufacturer to send a message that includes information other than those described above, and a power supply made by or for the same manufacturer may be configured to recognize the information. The information may include data that are typically proprietary or specific to devices of the same manufacturer such as battery charging cycles or data for updating or reconfiguring the power supply. Thus, manufacturers may provide a power supply that can receive not only, from any device made by any manufacturer and which conforms to the embodiments described above, generic power requirement information, but also receive proprietary information from devices made by the same manufacturer. In other words, a power supply 200 can be configured to include both universal features and proprietary features.

Figure 4:
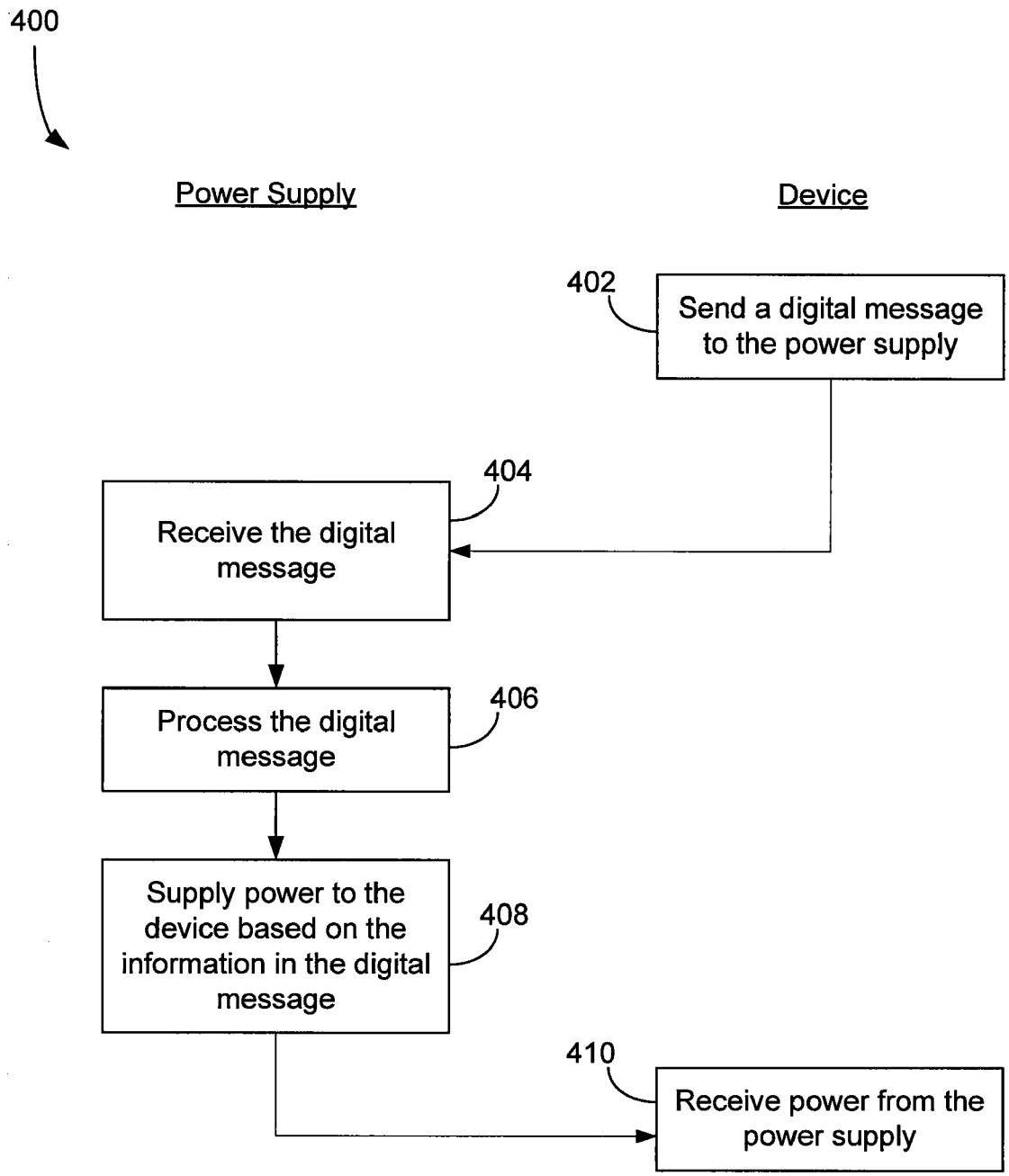
FIG. 4 is a flow diagram illustrating a process of supplying and receiving power in accordance with some embodiments.

Attention is now directed to FIG. 4, which is a flow diagram illustrating a process of supplying and receiving power in accordance with some embodiments. When a device is first electrically coupled to a power supply that is drawing power from a power source, the device transmits a digital message to the power supply (402). In some embodiments, the digital message includes the power requirements of the device or an identifier of a power profile or battery. The message is received by the power supply (404) and processed by the power supply (406). The processing includes determining the type of message, inspecting the contents of the message, and, based on the contents, providing the proper parameters to programmable regulators that control the amount of voltage or current to be supplied to the device. If the contents include an encoded statement of power requirements, the power supply decodes the statement. If the payload includes an identifier of a battery or a power profile, the power supply retrieves a data set of power requirements associated with the identifier.

Power is supplied to the device based on the information in the digital message (408). The power requirement parameters included in the message or derived from information included in the message are used to configure the power supply (or more particularly, programmable regulators within the power supply) to supply the proper voltage, current, and/or power to the device. The power supplied by the power supply is received by the device (410). The power received by the device may be used to power the device for operation and/or charge a battery coupled to the device.

Figure 5A:
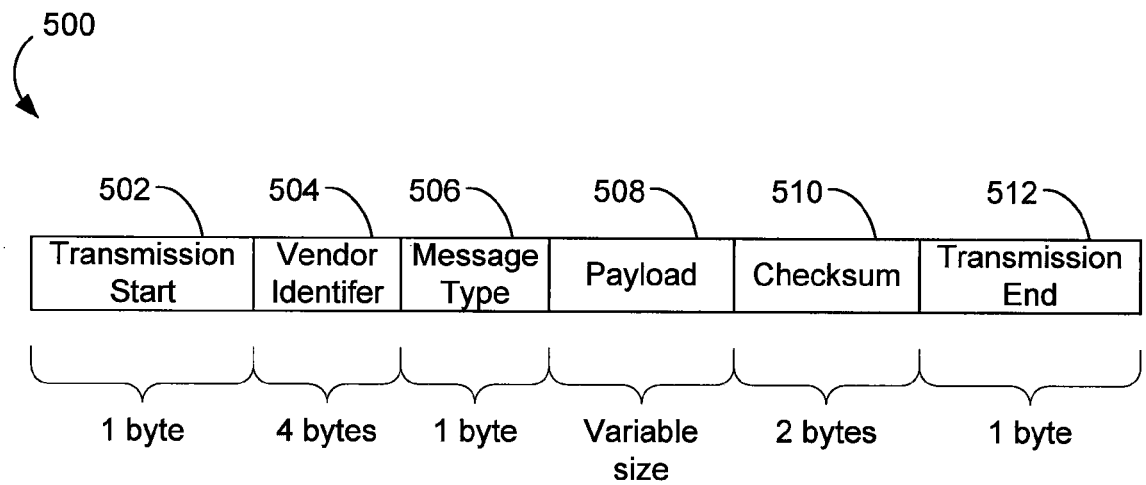
FIGS. 5A-5B are diagrams illustrating a packet structure of a digital communication between a power supply and a device in accordance with some embodiments.
Figure 5B:
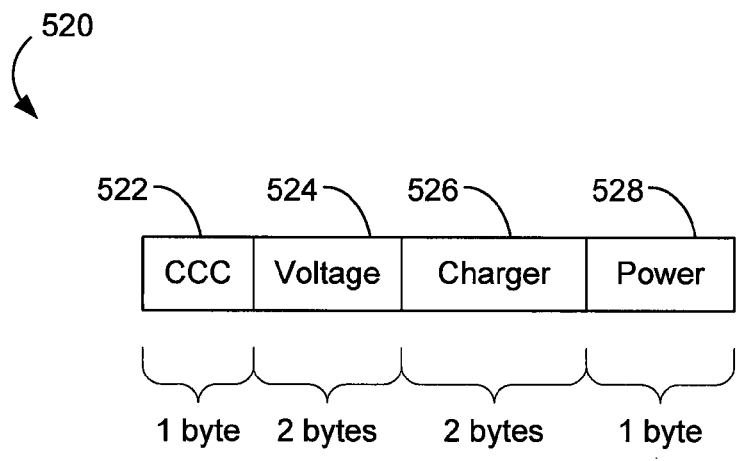

Attention is now directed to FIGS. 5A-5B, which are diagrams illustrating a packet structure of a digital message that may be exchanged between a power supply and a device in accordance with some embodiments. The digital messages sent and received by the power supply 200 and devices 202 may conform to a predefined packet-based protocol. An exemplary digital message packet 500 includes a 1-byte transmission start segment 502 indicating the start of the message, a 4-byte vendor/manufacturer identifier 504, a 1-byte message type segment 506 indicating the type of message, a variable size payload 508, a 2-byte checksum 510, and a 1-byte transmission end segment 512 indicating the end of the packet. It should be appreciated that the sizes of the packet segments described above are merely exemplary and that alternate segment sizes may be used. For example, the transmission start segment 502 and the transmission end segment 512 may each be less than 1 byte long. As another example, the vendor/manufacturer identifier 504 may be 2 bytes rather than 4 bytes.

The checksum 510 is used for error detection. The checksum 510, as used herein, refers generally to any kind of redundancy check for error detection. The checksum 510 may be implemented using any of a variety of error detection technologies now known or later developed, including but not limited to cyclic redundancy checks, checksum algorithms, and hash functions.

In an exemplary embodiment, the protocol includes at least four message types. The message types may include three flow control message types and a power statement message type. The flow control message types serve to signal success or error in the receipt of messages. In some embodiments, the flow control message types include the acknowledgement message (ACK), the non-acknowledgement message (NACK), and the cancel message (CAN). These messages are further described below, in relation to FIGS. 6-7. A power statement message type specifies the power requirements of the device. In some embodiments, the power statement includes, e.g., voltage, current, and/or battery type parameters. In some other embodiments, the power statement includes more or less parameters than described above. In further other embodiments, the power statement includes an identifier of a power profile or a battery model, with which a power supply having databases of power profiles and/or battery information can look up the corresponding power requirements. If a manufacturer wishes to enable exchange of proprietary information via the digital messages, a proprietary or manufacturer-specific message type may also be included.

The payload 508 in the message 500 is the segment that holds the data of interest. For flow control messages such as ACK, NACK, and CAN, the payload 508 may be omitted (i.e., 0 bytes). For power statement messages, the payload 508 may include the power requirements information or information from which power requirements may be identified. In an exemplary embodiment, the payload 520 of a power statement message that specifies power requirements for a device includes a client condition code segment 522, a voltage segment 524, a charger segment 526, and a power value segment 528, further details of which are described below. In an embodiment where the power supply can accept messages containing proprietary information from the device, the payload 508 may include the proprietary information structured in a manufacturer-specified format and size.

The client condition code 522 may be an encoded segment that provides information regarding general power parameters. In some embodiments, the client condition code 522 provides information regarding whether the desired voltage for the device is high power or low power, whether the desired voltage for the device is positive or negative, whether battery charging power is needed, and the technology of the battery to be charged (e.g., lithium-ion, nickel metal hydride, etc.). A table of an exemplary encoding of the client condition code 522 is included below (the code uses the lowest 5 bits of the byte; the other 3 bits in the byte may reserved for future code expansion or left unused):

| CCC Byte | | | | |
|---|---|---|---|---|
| bit 4-bit 0 | VOLTAGE Power | VOLTAGE Polarity | CHARGER | CHARGER Battery technology |
| 00000 | Low | Negative | Off | N/A |
| 00001 | High | Negative | Off | N/A |
| 00010 | Low | Positive | Off | N/A |
| 00011 | High | Positive | Off | N/A |
| 00100 | Low | Negative | On | Li-Ion |
| 00101 | High | Negative | On | Li-Ion |
| 00110 | Low | Positive | On | Li-Ion |
| 00111 | High | Positive | On | Li-Ion |
| 01000 | Low | Negative | Off | N/A |
| 01001 | High | Negative | Off | N/A |
| 01010 | Low | Positive | Off | N/A |
| 01011 | High | Positive | Off | N/A |
| 01100 | Low | Negative | On | Li-Poly |
| 01101 | High | Negative | On | Li-Poly |
| 01110 | Low | Positive | On | Li-Poly |
| 01111 | High | Positive | On | Li-Poly |
| 10000 | Low | Negative | Off | N/A |
| 10001 | High | Negative | Off | N/A |
| 10010 | Low | Positive | Off | N/A |
| 10011 | High | Positive | Off | N/A |
| 10100 | Low | Negative | On | Ni-CD |
| 10101 | High | Negative | On | Ni-CD |
| 10110 | Low | Positive | On | Ni-CD |
| 10111 | High | Positive | On | Ni-CD |
| 11000 | Low | Negative | Off | N/A |
| 11001 | High | Negative | Off | N/A |
| 11010 | Low | Positive | Off | N/A |
| 11011 | High | Positive | Off | N/A |
| 11100 | Low | Negative | On | Ni-MH |
| 11101 | High | Negative | On | Ni-MH |
| 11110 | Low | Positive | On | Ni-MH |
| 11111 | High | Positive | On | Ni-MH |

The voltage segment 524 is an encoded segment that specifies the desired output voltage and upper limit current to be supplied by the power supply. The charger segment 526 specifies the number of cells in the battery or batteries to be charged and the desired current value for charging the battery or batteries of the device. A table of an exemplary encoding of the voltage segment 524 and the charger segment 526 is included below (the code uses the lowest 5 bits of each byte; the other 3 bits in each byte may be reserved for future code expansion or left unused):

| bit 4-bit 0 | VOLTAGE Byte 0 Low Power Output Voltage | VOLTAGE Byte 1 Low Power Limit Current | VOLTAGE Byte 0 High Power Output Voltage | VOLTAGE Byte 1 High Power Limit Current | CHARGER Byte 0 Number of Cells | CHARGER Byte 1 Charge Current |
|---|---|---|---|---|---|---|
| 00000 | 0.0 | 0.0 | 0.0 | 0.0 | 0.00 | 0.00 |
| 00001 | 0.5 | 0.1 | 1.0 | 0.3 | 1.00 | 0.05 |
| 00010 | 1.0 | 0.1 | 2.0 | 0.6 | 2.00 | 0.10 |
| 00011 | 1.5 | 0.2 | 3.0 | 0.9 | 3.00 | 0.15 |
| 00100 | 2.0 | 0.2 | 4.0 | 1.2 | 4.00 | 0.20 |
| 00101 | 2.5 | 0.3 | 5.0 | 1.5 | 5.00 | 0.25 |
| 00110 | 3.0 | 0.4 | 6.0 | 1.8 | 6.00 | 0.30 |
| 00111 | 3.5 | 0.4 | 7.0 | 2.1 | 7.00 | 0.35 |
| 01000 | 4.0 | 0.5 | 8.0 | 2.4 | | 0.40 |
| 01001 | 4.5 | 0.5 | 9.0 | 2.7 | | 0.45 |
| 01010 | 5.0 | 0.6 | 10.0 | 3.0 | | 0.50 |
| 01011 | 5.5 | 0.7 | 11.0 | 3.3 | | 0.55 |
| 01100 | 6.0 | 0.7 | 12.0 | 3.6 | | 0.60 |
| 01101 | 6.5 | 0.8 | 13.0 | 3.9 | | 0.65 |
| 01110 | 7.0 | 0.8 | 14.0 | 4.2 | | 0.70 |
| 01111 | 7.5 | 0.9 | 15.0 | 4.5 | | 0.75 |
| 10000 | 8.0 | | 16.0 | | | 0.80 |
| 10001 | 8.5 | | 17.0 | | | 0.85 |
| 10010 | 9.0 | | 18.0 | | | 0.90 |
| 10011 | 9.5 | | 19.0 | | | 0.95 |
| 10100 | 10.0 | | 20.0 | | | 1.00 |
| 10101 | 10.5 | | 21.0 | | | 1.05 |

| bit 4-bit 0 | VOLTAGE Byte 0 Low Power Output Voltage | VOLTAGE Byte 1 Low Power Limit Current | VOLTAGE Byte 0 High Power Output Voltage | VOLTAGE Byte 1 High Power Limit Current | CHARGER Byte 0 Number of Cells | CHARGER Byte 1 Charge Current |
|---|---|---|---|---|---|---|
| 10110 | 11.0 | | 22.0 | | | 1.10 |
| 10111 | 11.5 | | 23.0 | | | 1.15 |
| 11000 | 12.0 | | 24.0 | | | 1.20 |
| 11001 | 12.5 | | 25.0 | | | 1.25 |
| 11010 | 13.0 | | 26.0 | | | 1.30 |
| 11011 | 13.5 | | 27.0 | | | 1.35 |
| 11100 | 14.0 | | 28.0 | | | 1.40 |
| 11101 | 14.5 | | 29.0 | | | 1.45 |
| 11110 | 15.0 | | 30.0 | | | 1.50 |
| 11111 | 15.5 | | 31.0 | | | 1.55 |

The power segment 528 is an encoded segment that specifies the desired amount of power (in watts). A table of an exemplary encoding of the power segment 528 (the code uses the lowest 5 bits of the byte; the other 3 bits in the byte may be reserved for future code expansion or left unused):

| b 4-b 0 | Power Watts |
|---|---|
| 00000 | 0 |
| 00001 | 0.5 |
| 00010 | 1 |
| 00011 | 1.5 |
| 00100 | 2 |
| 00101 | 2.5 |
| 00110 | 3 |
| 00111 | 3.5 |
| 01000 | 4 |
| 01001 | 4.5 |
| 01010 | 5 |
| 01011 | 5.5 |
| 01100 | 6 |
| 01101 | 6.5 |
| 01110 | 7 |
| 01111 | 7.5 |
| 10000 | 8 |
| 10001 | 14 High Power |
| 10010 | 20 High Power |
| 10011 | 26 High Power |
| 10100 | 32 High Power |
| 10101 | 38 High Power |
| 10110 | 44 High Power |
| 10111 | 50 High Power |
| 11000 | 56 High Power |
| 11001 | 62 High Power |
| 11010 | 68 High Power |
| 11011 | 74 High Power |
| 11100 | 80 High Power |
| 11101 | 86 High Power |
| 11110 | 92 High Power |
| 11111 | 98 High Power |

It should be appreciated, however, that the packet protocol and encodings described above are merely exemplary. The protocol may take on an alternative format and may include more or less information that that described above. Furthermore, the parameters may specified by an alternative format or encoding than those described above.

Figure 6:
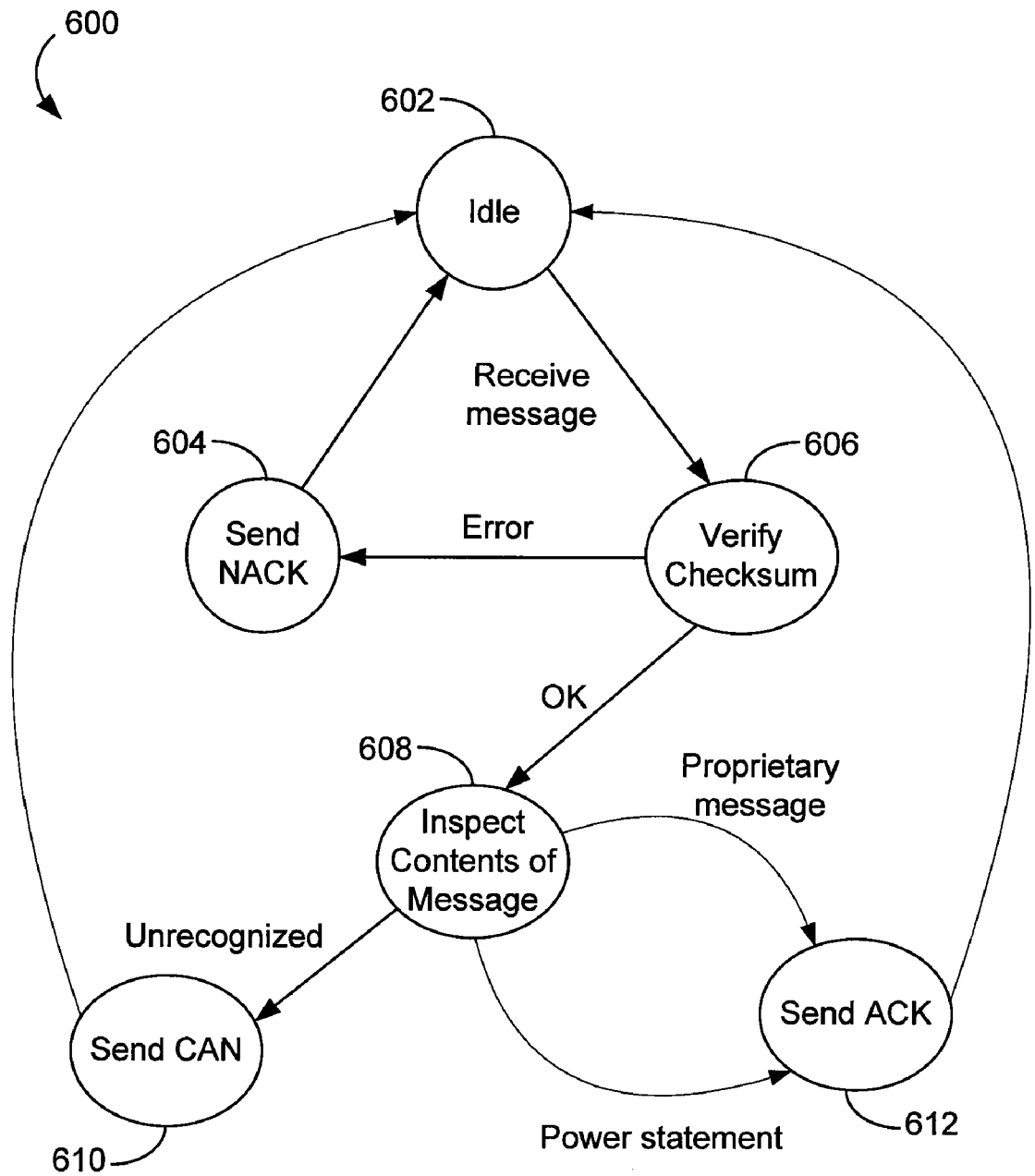
FIG. 6 is a state diagram illustrating digital communication states of a power supply in accordance with some embodiments.
Figure 7:
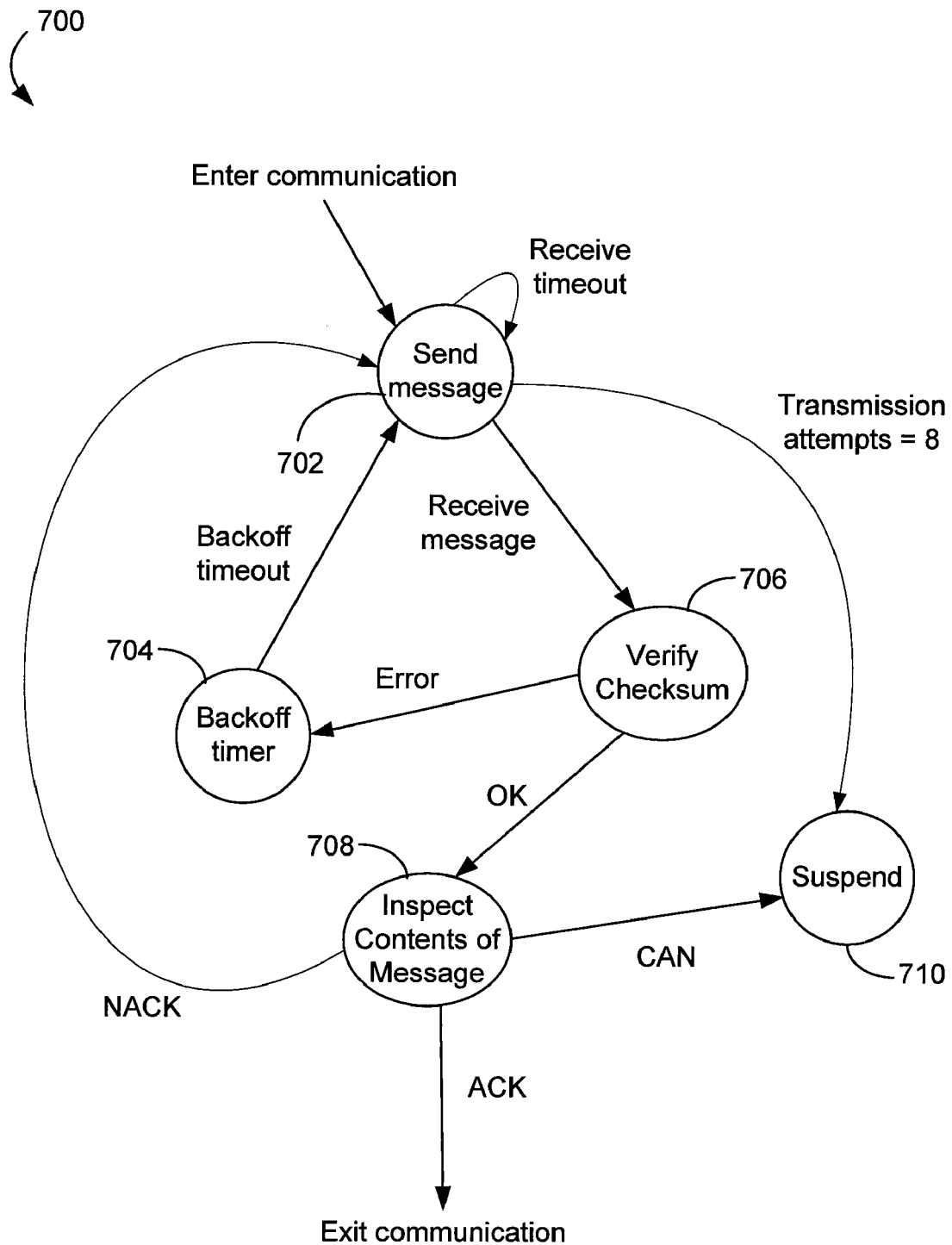
FIG. 7 is a state diagram illustrating digital communication states of a device in accordance with some embodiments.

Attention is now directed to FIGS. 6 and 7, which are state diagrams illustrating digital communication states of a power supply and of a device, respectively, in accordance with some embodiments. The power supply state diagram 600 and the device state diagram 700 illustrate the states of the power supply and the device, respectively, with respect to the exchange of digital messages.

The power supply is initially in an idle state (602) with respect to a device. For example, while the device is not electrically coupled to the power supply, the power supply is in the idle state 602 with respect to the device. It should be appreciated that the power supply may be in the idle state 602 with respect to a device that is electrically coupled to the power supply. It should further be appreciated that while a power supply is in the idle state 602 with respect to one device, it may be in another state with another device that is electrically coupled to the power supply. While the power supply is in the idle state 602, the power supply is passively waiting for a message from the device. After a message from the device is received by the power supply, the power supply performs error detection on the message from the device by verifying the checksum 510 (606). If there is an error, a NACK message is sent to the device (604) and the power supply returns to the idle state 602 to wait for the next message from the device. If the message does not contain errors, the contents of the message, including the vendor code 504 and the payload 508, is inspected (608). If the message is unrecognized, for example, because it is a proprietary message and the vendor or manufacturer code 504 is an unrecognized vendor or manufacturer (e.g., because the power supply and the device are made by different manufacturers), a CAN message is sent (610) and the power supply returns to the idle state 602. If the message is recognized, an ACK message is sent (612) and the power supply returns to the idle state (602) to wait for further messages from the device. It may be the case that once the power supply recognizes the message and sends an ACK message, the power supply may configure itself to supply power to the device.

A device, when coupled to a power supply, may enter into a communication mode and send a message (702). For example, when the device is first connected to the power supply, the device may draw power from the +5V wake-up voltage to power its microprocessor 302 and execute instructions to send a message, such as a power statement message. After a message is sent, the device waits for a response message from the power supply. If no response is received after a predefined receive timeout, the message is resent (702). If, after a predefined number of attempts, e.g., 8 attempts, to transmit the same message, no response is received, the device goes into a suspend state 710. In some embodiments, while in the suspend state, a device will no longer attempt to send a proprietary message, although non-proprietary information may still be sent. In other embodiments, for example after a receive timeout, a device will no longer attempt to attempt to transmit messages until a new power supply connection is established.

If a response message is received, the device performs error detection on the message from the power supply by verifying the checksum 510 (706). If there is an error, the device backs off in accordance with a backoff timer (704). After the backoff timer has timed out, the message is resent (702).

If the message does not have errors, the contents of the message, particularly the message type, is inspected (708). If the message is an ACK message, the device exits the communication mode. If the message is a NACK message, the device backs off in accordance with backoff timer (704) and then resends the message (702). Of course, the device may enter the communication mode later, to send another message, if needed. If the message is a CAN message, the device enters the suspend state 710. In embodiments where the device can send messages containing proprietary information, a CAN message means that the power supply does not recognize the vendor/manufacturer of the device, as indicated by the vendor/manufacturer identifier 504. This means that any message containing proprietary information will not be properly processed by the power supply since the power supply will not know the proper format of the proprietary information payload. Therefore, the device enters into the suspend state 710, where the device will suspend transmission of information that invoked the CAN response, i.e., the device will not send messages with proprietary information to the power supply, although other communications may take place.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A power supply comprising:
   an input port to receive power from a power source;
   a plurality of regulators to convert the received power, comprising first and second programmable regulators to separately provide converted power to a device in accordance with power requirements of the device;
   an output port comprising a plurality of conductor lines to supply the converted power to the device, wherein a first conductor line is coupled to the first programmable regulator that is configured to provide constant voltage and a second conductor line is coupled to the second programmable regulator that is configured to provide constant current; and
   a microprocessor configured to communicate digitally with the device through the output port to determine the power requirements of the device.

2. The power supply of claim 1, wherein the first programmable regulator is configured to power the device and the second programmable regulator is configured to charge a battery disposed in the device.

3. The power supply of claim 1, further comprising circuitry to provide a predefined voltage to the device through the output port.

4. The power supply of claim 1, further comprising circuitry to provide power to a microprocessor in the device.

5. The power supply of claim 4, wherein the circuitry is configured to provide a predefined voltage to the microprocessor in the device.

6. The power supply of claim 4, wherein the circuitry is configured to provide the power to the microprocessor in the device via a predefined voltage line configured to be coupled to the microprocessor.

7. The power supply according to claim 1, wherein the power received from the power source is DC.

8. A method for supplying power to a device, comprising:
   at a power supply:
      receiving power at an input port from a power source;
      converting the received power using the plurality of regulators including first and second programmable regulators, the first and second programmable regulators separately providing converted power to a device in accordance with power requirements of the device through an output port comprising a plurality of conductor lines, wherein a first conductor line is coupled to the first programmable regulator that is configured to provide constant voltage and a second conductor line is coupled to the second programmable regulator that is configured to provide constant current; and
      communicating digitally with the device through the output port to determine the power requirements of the device.

* * * * *